United States Patent
Tanaka et al.

(10) Patent No.: US 6,449,737 B1
(45) Date of Patent: Sep. 10, 2002

(54) COMMAND EXECUTING METHOD OF INFORMATION REPRODUCING APPARATUS, RECORD MEDIUM FOR RECORDING PROGRAM THAT CAUSES INFORMATION REPRODUCING APPARATUS TO EXECUTE COMMAND, AND DISC REPRODUCING APPARATUS

(75) Inventors: Hiroaki Tanaka, Hadano; Takuji Yoshida, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/249,850

(22) Filed: Feb. 16, 1999

(30) Foreign Application Priority Data

Feb. 16, 1998 (JP) .......................... 10-032816
Jan. 27, 1999 (JP) .......................... 11-019012

(51) Int. Cl.$^7$ ................................ H01H 3/05
(52) U.S. Cl. ..................... 714/38; 369/32; 711/114
(58) Field of Search .................. 714/38, 8; 369/32, 369/33, 30; 386/95; 711/114; 713/201

(56) References Cited

U.S. PATENT DOCUMENTS

| | | | | |
|---|---|---|---|---|
| 5,128,995 A | * | 7/1992 | Arnold et al. | 380/4 |
| 5,461,603 A | * | 10/1995 | Otsuka | 369/120 |
| 5,475,668 A | * | 12/1995 | Azumatani et al. | 369/58 |
| 5,564,013 A | * | 10/1996 | Ito et al. | 714/15 |
| 5,703,842 A | * | 12/1997 | Tonegawa | 369/32 |
| 5,864,658 A | * | 1/1999 | Theobald | |
| 5,892,902 A | * | 4/1999 | Clark | 713/201 |
| 6,101,162 A | * | 8/2000 | Kim | 369/124.01 |

* cited by examiner

Primary Examiner—Robert Beausoleil
Assistant Examiner—Rita A Ziemer
(74) Attorney, Agent, or Firm—Oblon, Spivak, McClelland, Maier & Neustadt, P.C.

(57) ABSTRACT

A disc reproducing apparatus reproduces information as a digital signal from a disc, having an interface for sending and receiving a reproduction signal and a command to/from a host computer, comprising a processor unit for controlling the operation of the disc reproducing apparatus, a first signal transfer path, connected to the inter-face, for transferring a command signal corresponding to a command received from the host computer to the processor unit, an operating unit, disposed in the disc reproducing apparatus, for generating an operation signal corresponding to a user's operation, and a second signal transfer path, connected to the operating unit, for transferring an operation signal corresponding to the user's operation of the operating unit to the processor unit, wherein the processor unit determines whether or not to validate the execution of the command of the command signal transferred from the host computer through the first signal transfer path corresponding to the operation signal transferred from the operating unit through the second signal transfer path. Since the content of the operation of the disc reproducing apparatus can be freely selected by the user, even if a computer virus knows the command execution restricting function, the computer virus does not know the content of the operation of the operating portion.

16 Claims, 15 Drawing Sheets

FIG. 6

Command > Reset_drv
  Press ejection button twice or more.
  Count the number of times that you pressed the ejection button.

How may times did you press the ejection button ?         5 ↓

The setting of the drive have been reset.

Command >

FIG. 10

Command > Reset_drv ↓

Place any disc on the tray and close the tray. After the drive has been initialized (led of drive puts off), (immediately) press the enter key.
_ ↓

The setting of the drive have been reset.

Command >

FIG. 13

Command > Reset_drv ↓

Place any disc on the tray and close the tray.
After the drive has been initialized (led of drive puts off), select and type numeric value coresponding to disc type.

1. AUDIO DISC
2. CD-ROM DISC
3. YOUR ORIGINAL DISC SUCH AS CD-R OR CD-RW
4. VIDEO CD DISC

Number:_____

The settings of the drive have been reset.

Command >

COMMAND EXECUTING METHOD OF INFORMATION REPRODUCING APPARATUS, RECORD MEDIUM FOR RECORDING PROGRAM THAT CAUSES INFORMATION REPRODUCING APPARATUS TO EXECUTE COMMAND, AND DISC REPRODUCING APPARATUS

BACKGROUND OF THE INVENTION

1. Field of the Invention

The present invention relates to a command executing method of an information reproducing apparatus, a record medium for recording a program that causes an information reproducing apparatus to execute a command, and a disc reproducing apparatus for reproducing data from an optical disc such as a CD-ROM or a DVD.

2. Description of the Related Art

In recent years, as data communications using public telephone lines such as Internet are becoming common, computer viruses that are programs that are not issued by users cause computer systems to malfunction and are becoming serious social problems.

Most of peripheral units such as a CD-ROM drive and a DVD drive that are operated corresponding to commands received from host computers cannot know whether such commands have been infected by computer viruses. Thus, the peripheral units simply receive and execute the programs infected by computer viruses.

To prevent an optical disc drive such as a CD-ROM drive or a DVD drive from being operated with a program infected by a computer virus, a method for restricting the operation of the optical disc drive with a password designated to each user or each disc title has been proposed.

However, in such an optical disc drive, a program infected by a computer virus may cause setting information such as a password to be erased or forged. Once an optical disc drive is infected by a computer virus, the optical disc drive may not be used.

In such circumstances, a means for securely protecting an optical disc drive from a program infected by a computer virus has been desired.

SUMMARY OF THE INVENTION

The present invention is made from the above-described point of view. An object of the present invention is to provide a disc reproducing apparatus that prevents a command of a virus-infected program that resides in a computer system from being executed.

Another object of the present invention is to provide a command executing method for an information reproducing apparatus so as to prevent a virus-infected program that resides in a computer system from disturbing the operation of the information reproducing apparatus.

A further object of the present invention is to provide a record medium for recording a program that causes an information reproducing apparatus to prevent a virus-infected program that resides in a computer system from disturbing the operation of the information reproducing apparatus.

The present invention is a command executing method of an information reproducing apparatus, comprising the steps of receiving through a first transfer path a command for managing the operation of a reproducing portion that reproduces information, determining whether or not to validate the execution of the command received through the first transfer path corresponding to information obtained through a second transfer path, and executing the command when the execution of the command is validated.

Thus, according to the present invention, as a condition for executing a command issued from a command generating unit of a host unit or the like, since a command received from a path that the command generating unit does not know is added, a command forged by a computer virus that resides in the command generating unit can be prevented from being executed. Consequently, a disc reproducing apparatus that is highly secured can be provided.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 6 is a schematic diagram showing the content of an output screen according to the first embodiment of the present invention;

FIG. 10 is a schematic diagram showing the content of an output screen according to the second embodiment of the present invention;

FIG. 13 is a schematic diagram showing the content of an output screen according to the third embodiment of the present invention;

DESCRIPTION OF PREFERRED EMBODIMENTS

Next, with reference to the accompanying drawings, embodiments of the present invention will be described.

Figure 1:
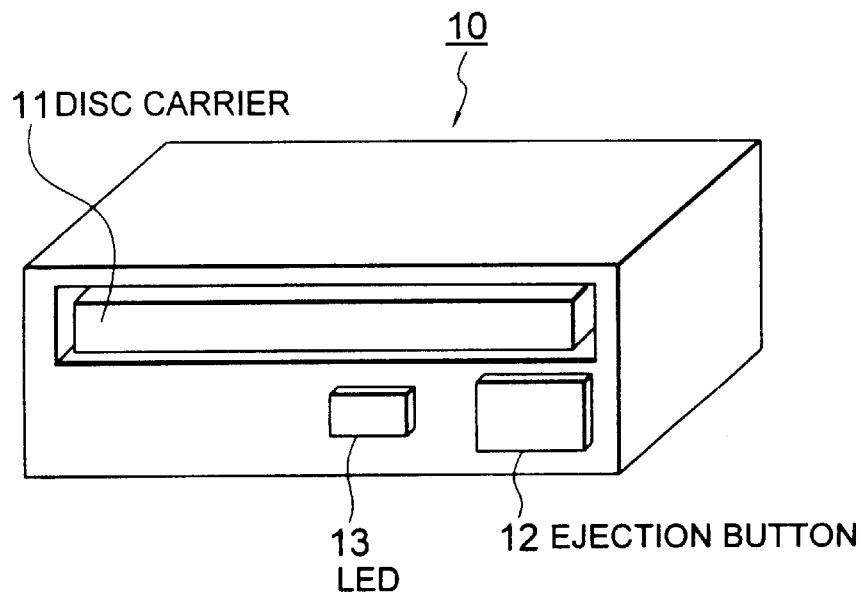
FIG. 1 is a front perspective view showing an appearance of an optical disc drive according to an embodiment of the present invention.
Figure 2:
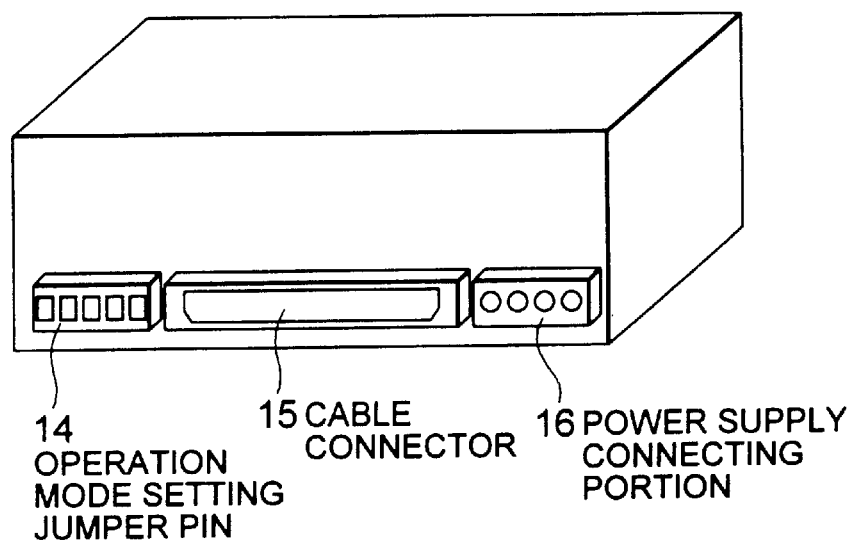
FIG. 2 is a rear perspective view showing an appearance of the optical disc drive according to an embodiment of the present invention.

FIGS. 1 and 2 are front and rear perspective views showing appearances of an optical disc drive according to an embodiment of the present invention. As shown in FIGS. 1 and 2, the optical disc drive 10 has a disc carrier 11, an ejection button 12, an LED 13, an operation mode setting jumper pin 14, a cable connector 15, and a power supply connecting portion 16. The ejection button 12 is used to eject (unload) a disc loaded in the optical disc drive 10. The LED 13 is used to display an operation state of the optical disc drive 10. The cable connector 15 is used to connect the optical disc drive 10 to a computer. The power supply connecting portion 16 is used to connect the optical disc drive 10 to a power cable. A disc is rotatably set to the disc carrier 11. The disc carrier 11 has a driving mechanism that carries a disc between a user disc access position and an optical pickup disc access position. The driving mechanism is composed of various electric and mechanical parts such as a motor, a gear, and a lever. At the user disc access position, the user can set a disc. At the optical pickup accessing position, the disc is accessed by an optical pickup. The disc carrier 11 is largely categorized as a tray type, a drawer type, a cassette type, and a slot-in type. In the tray type disc carrier, only a disc space is formed. In the drawer type disc carrier, a disc driving/reproducing mechanism is disposed. In the cassette type of disc carrier, a disc is housed in a cassette. Users insert the disc cassette into the disk by hand. In the slot-in type disc carrier, a disc is directly loaded to the optical disc drive.

Figure 3:
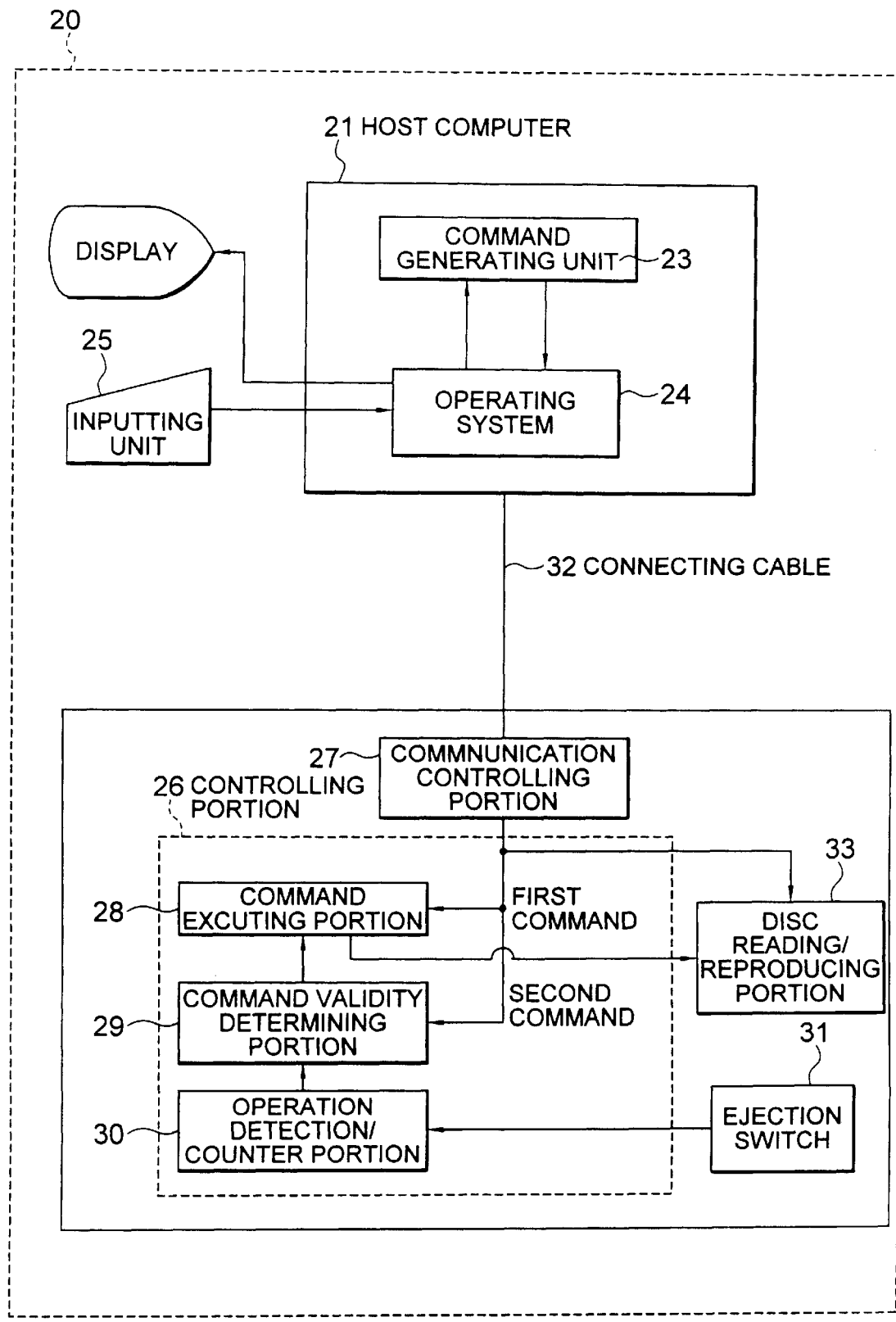
FIG. 3 is a block diagram showing the structure of a computer system having an optical disc drive as a peripheral unit according to an embodiment of the present invention.

FIG. 3 is a block diagram showing the structure of a computer system connected to the optical disc drive 10. As shown in FIG. 3, the computer system 20 comprises a host computer 21, an inputting unit 25, an outputting unit (not shown), an optical disc drive 10, a communication unit (not shown), and a magnetic disk drive (not shown). An OS (Operating System) 24 is pre-installed to the host computer 21. The inputting unit 25 includes for example a keyboard and a mouse. The outputting unit includes for example a display and a printer. The communicating unit is for example a modem. The magnetic disc drive includes for example a hard disk drive and a floppy disk drive.

The optical disc drive 10 comprises a program storage type of controlling portion 26, a communication controlling portion 27, an ejection switch 31, and a disc reading/reproducing portion 33. The ejection switch 31 causes a tray access command corresponding to the operation of the ejection button 12 (shown in FIG. 1) to notify to the controlling portion 26.

The host computer 21 has a command generating unit 23. The command generating unit 23 generates a command to cause the controlling portion 26 of the optical disc drive 10 to execute under the control of the OS 21. A command generated by the command generating unit 23 is transferred to the controlling portion 26 of the optical disc drive 10 through the communication controlling portion 27 as an interface.

The controlling portion 26 of the optical disc drive 10 is composed of a command executing portion 28, a command validity determining portion 29, and an operation detection/counter portion 30. When the controlling portion 26 receives a command generated by the command generating unit 23, the command validity determining portion 29 determines whether or not the received command is valid. In other words, the command validity determining portion 29 compares operation setting information that the user pre-sets to the optical disc drive 10 with operation detection information detected by the operation detection/counter portion 30. When the received command is valid, the command validity determining portion 29 sends the command to the command executing portion 28. The command executing portion 28 executes the command.

Next, the setting method for the operation setting information will be described. The controlling portion 26 of the optical disc drive 10 can directly monitor a user's operation of the ejection switch 31 of the optical disc drive. The controlling portion 26 monitors the number of times of the operation of the ejection switch 31 and stores data thereof to the operation detection/counter portion 30. The operation detection/counter portion 30 is composed of a nonvolatile memory or the like.

The disc reading/reproducing portion 33 causes the optical pickup to read a signal recorded on a disc corresponding to a command transferred from the host computer 21. Thereafter, the disc reading/reproducing portion 33 demodulates and reproduces the signal that is read from the disc. Generally, the disc reading/reproducing portion 33 is composed of the above-described optical pickup, an optical pickup driving portion, a motor portion, a system controlling portion, a demodulating portion, and an error correcting portion. The optical pickup driving portion drives the optical pickup. The motor portion rotates the disc. The system controlling portion controls the entire system. The demodulating portion demodulates a signal that is read from the disc and extracts demodulated data. The error correcting portion corrects an error of the data.

Next, embodiments of the present invention will be described.

(1) First Embodiment

Next, with reference to FIGS. 4 to 7, a first embodiment of the present invention will be described.

Figure 4:
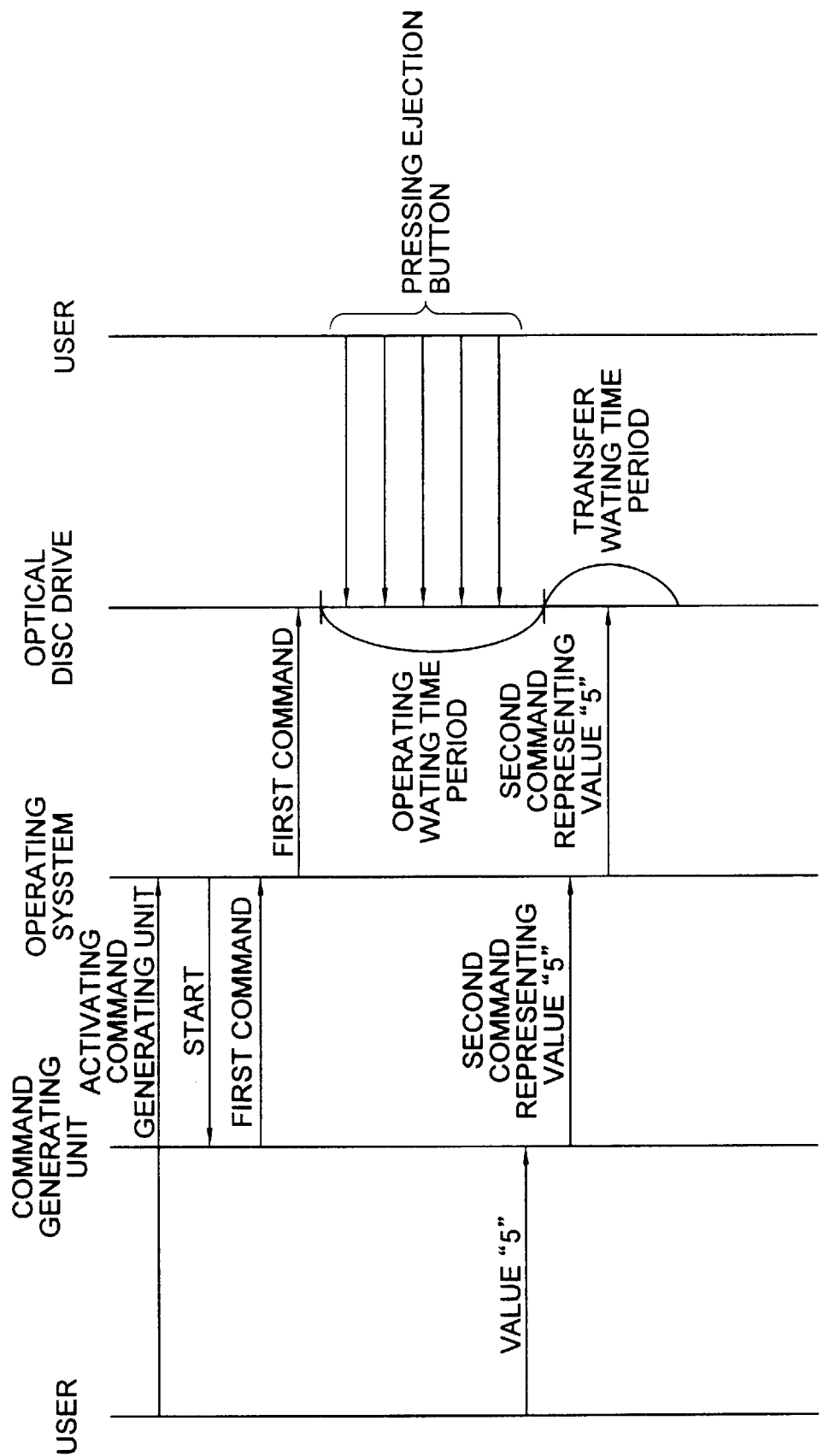
FIG. 4 is a state transition diagram showing a command transfer process of an optical disc drive according to a first embodiment of the present invention.
Figure 5:
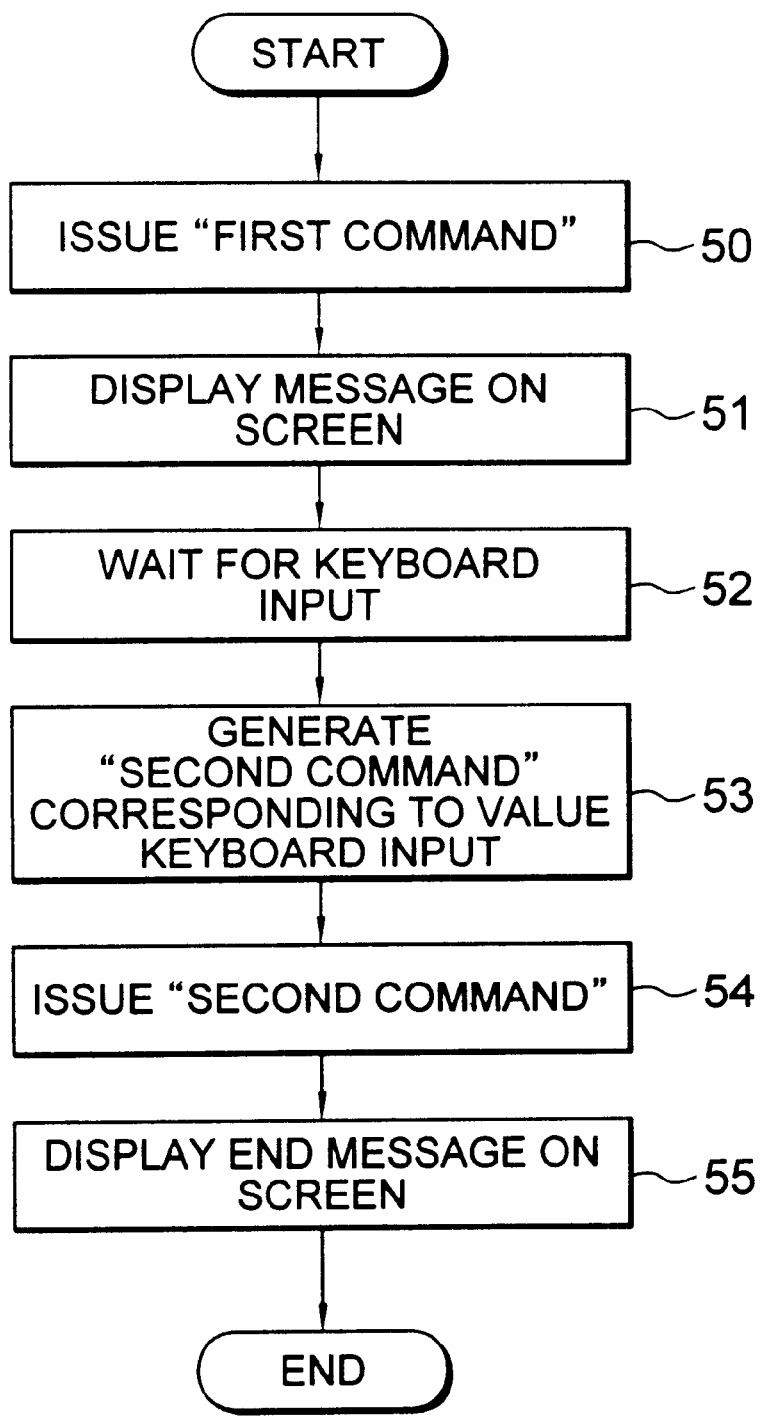
FIG. 5 is a flow chart showing an operation process of a command generating unit of a host computer according to the first embodiment of the present invention.
Figure 7:
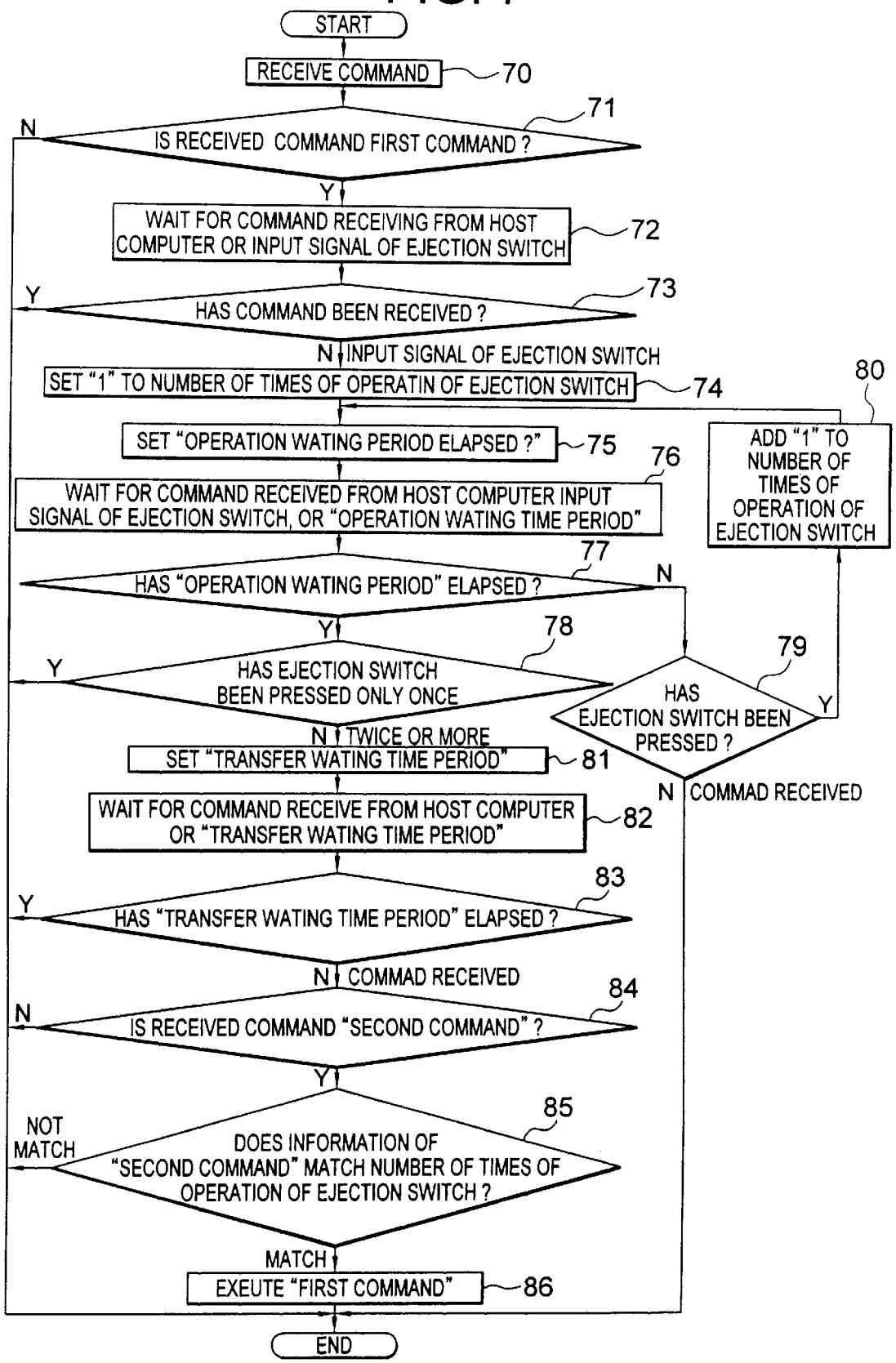
FIG. 7 is a flow chart showing a command execution restricting process of a controlling portion of the optical disc drive according to the first embodiment of the present invention.

FIG. 4 is a state transition diagram showing a command transfer process of an optical disc drive according to a first embodiment of the present invention. FIG. 5 is a flow chart showing an operation process of a command generating unit of a host computer according to the first embodiment of the present invention. FIG. 6 is a schematic diagram showing the content of an output screen according to the first embodiment of the present invention. FIG. 7 is a flow chart showing a command execution restricting process of a controlling portion of the optical disc drive according to the first embodiment of the present invention.

As shown in FIG. 4, the user inputs a predetermined start command (for example, a command "Reset drv" shown in FIG. 6) to the host computer 21 with the inputting unit 25 (for example, the keyboard). The OS 24 installed in the host computer 21 receives the start command and activates the command generating unit 23.

As shown in FIG. 5, when the command generating unit 23 gets started, it sends a first command to the OS 24. (step 50).

Just after the command generating unit 23 gets started, it generates the first command. For example, the first command causes the optical disc drive 10 to start.

After the command generating unit 23 has generated the first command, as shown in FIG. 6, the command generating unit 23 displays on the display for example a message "PRESS THE EJECTION BUTTON TWICE OR MORE" that prompts the user to perform the required operation with. (step 51)

As shown in FIG. 7, the first command that is sent to the OS 24 (at step 50) is transferred to the controlling portion 26 through the communication controlling portion 27 of the optical disc drive 10. The controlling portion 26 determines whether or not the transferred command is the valid first command that is issued just after the command generating unit 23 gets started. When the transferred command is not the first command, the controlling portion 26 performs a terminating process.

When the transferred command is the first command, the controlling portion 26 waits for the next input. (steps 70 to 72)

While the controlling portion 26 is waiting for the next input, if the controlling portion 26 receives the next command from the host computer 21, the controlling portion 26 determines that the first command is a command that is not issued by the user. (step 73)

While the controlling portion 26 is waiting for the next input, if the controlling portion 26 detects an operation signal corresponding to the user's operation of the ejection switch 31, the controlling portion 26 sets count value "1" to the operation detecting/counter portion 30 that stores data that represents the number of times of the operation of the ejection switch 31. (step 74)

Thereafter, the controlling portion 26 sets an operation waiting time period for detecting each operation of the ejection switch 31 that is successively pressed. (step 75)

When the user operates the ejection switch 31 in the operation waiting time period, the controlling portion 26 determines that the ejection switch 31 has been operated again and increments the count value of the operation detecting/counter portion 30 by "1". (steps 76 to 80)

Thereafter, the flow returns to step 75. The controlling portion 26 sets an operation waiting time period at step 75 and repeats the process.

When the operation of the ejection switch 31 has not been detected in the operation waiting time period at step 78, the controlling portion 26 detects the current count value of the operation detecting/counter portion 30. The controlling portion 26 decides the next process corresponding to the detected counter value. In this example, the controlling portion 26 performs different processes depending on whether the ejection switch 31 has been operated more than two times. When the ejection switch 31 has been successively operated twice or more, the controlling portion 26 sends data that represents this situation to the host computer 21. In addition, the controlling portion 26 sets a waiting time period for the next command received from the host computer 21 and waits for the next command. (steps 81 and 82)

As shown in FIG. 4, the number of times that the user operates the ejection switch 31 is five in this embodiment.

When the host computer 21 receives such data from the controlling portion 26 of the optical disc drive 10, as shown in FIG. 6, the host computer 21 displays a message on the screen that prompts the user to input for the number of times that user has pressed the ejection button 12. The host computer 21 waits for the user's input. (step 52)

When the user inputs a value corresponding to the number of times that he or she has pressed the ejection button 12, the command generating unit 23 of the host computer 21 generates the value as a second command. (step 53)

The second command is not a functional command, rather value data that is just sent to the optical disc drive 10.

As described above, in this example, it is assumed that the user has operated the ejection switch 31 five times. Thus, the user inputs value "5" against the prompt to the host computer 21 with the keyboard or the like.

The command generating unit 23 transfers the generated second command to the OS 24. (step 54)

The OS 24 further transfers the second command to the optical disc drive 10.

As shown in FIG. 7, the controlling portion 26 of the optical disc drive 10 that is waiting for the next command receives the second command from the OS 24. When the controlling portion 26 has received the second command within the predetermined command waiting time period, the controlling portion 26 activates the command validity determining portion 29. The command validity determining portion 29 compares the count value of the operation detecting/counter portion 30 with the value of the second command. (steps 83 to 85)

When the count value matches the value of the second command, the command validity determining portion 29 determines that the first command is a valid command and transfers the first command to the command executing portion 28. Thus, the command executing portion 28 executes the first command. (step 86)

Last, as shown in FIG. 5, the command generating unit 23 displays a message representing that the drive has been set on the screen and complete the process. (step 55)

(2) Second Embodiment

Next, with reference to FIGS. 8 to 11, a second embodiment of the present invention will be described.

Figure 8:
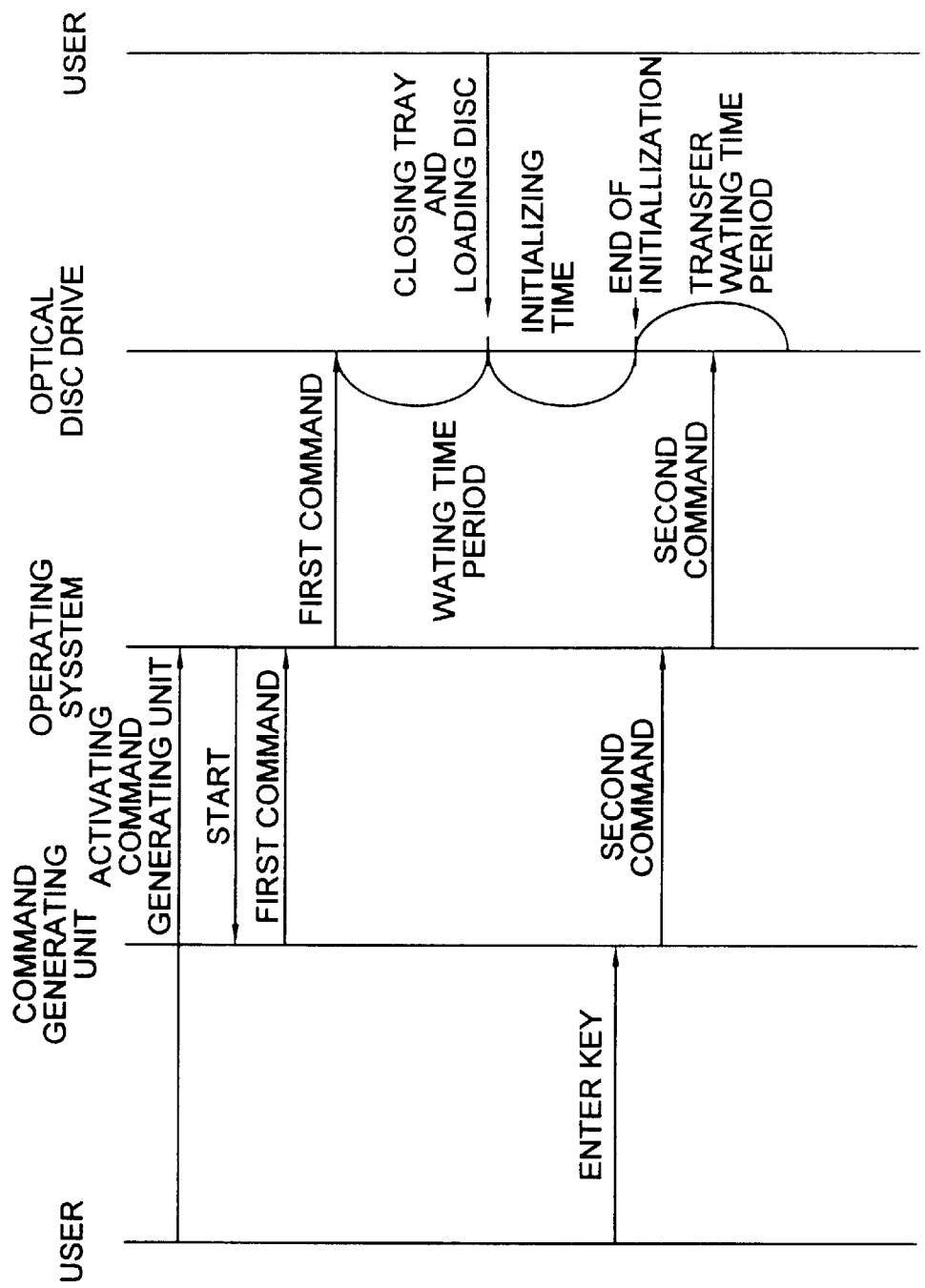
FIG. 8 is a state transition diagram showing a command transfer process of an optical disc drive according to a second embodiment of the present invention.
Figure 9:
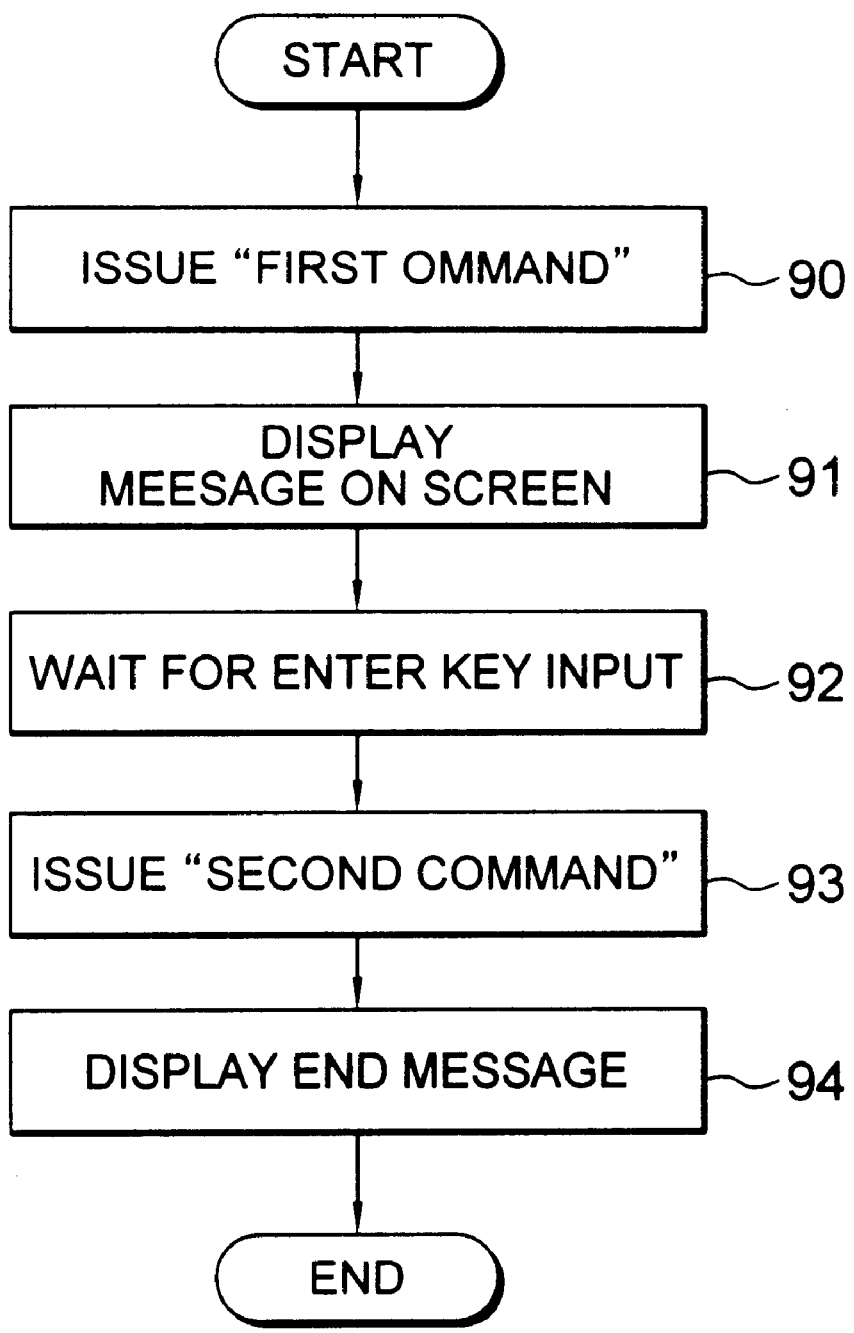
FIG. 9 is a flow chart showing an operation process of a command generating unit of a host computer according to the second embodiment of the present invention.
Figure 11:
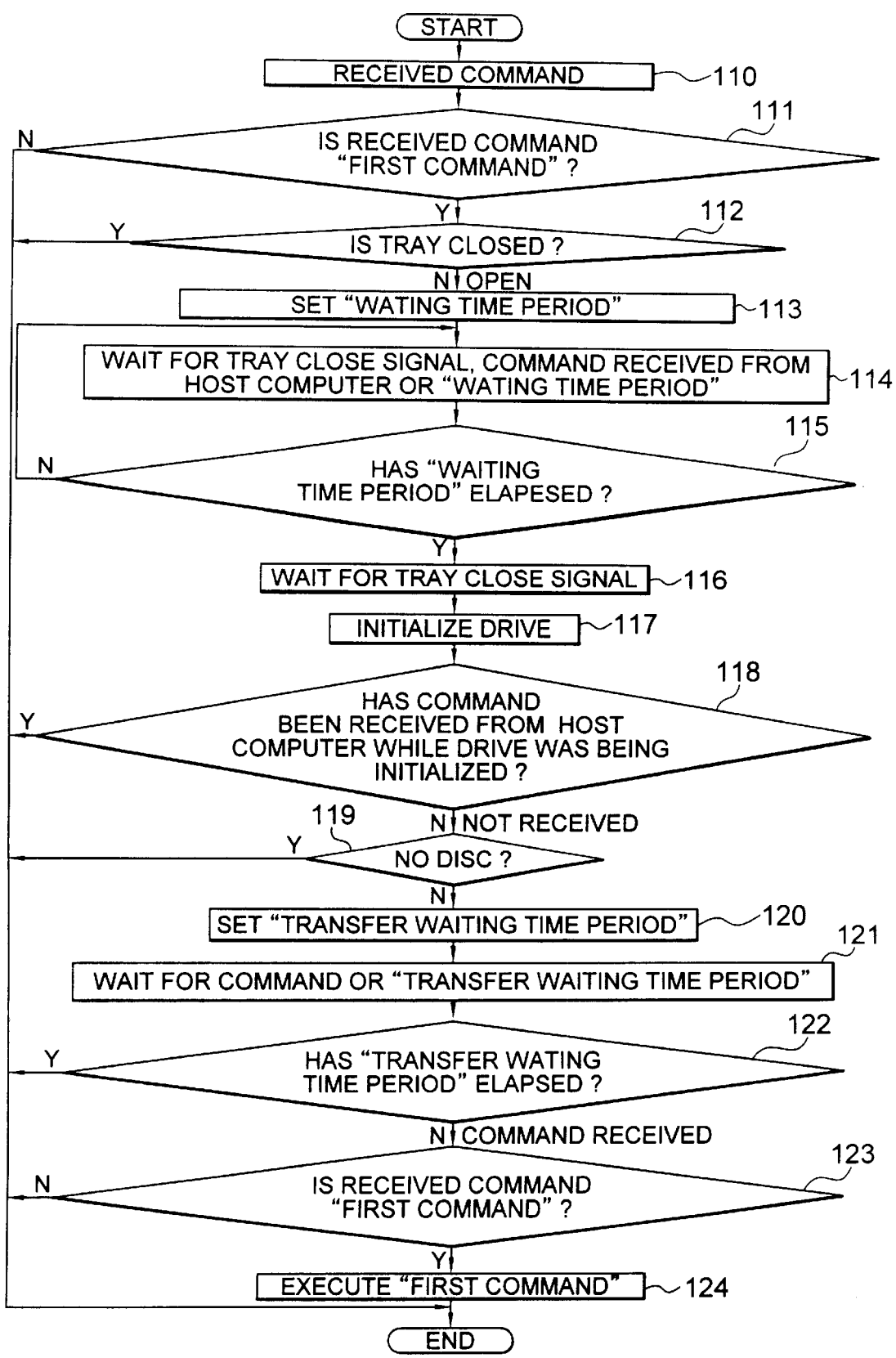
FIG. 11 is a flow chart showing a command execution restricting process of a controlling portion of the optical disc drive according to the second embodiment of the present invention.

FIG. 8 is a state transition diagram showing a command transfer process of an optical disc drive according to a second embodiment of the present invention. FIG. 9 is a flow chart showing an operation process of a command generating unit of a host computer according to the second embodiment of the present invention. FIG. 10 is a schematic diagram showing the content of an output screen according to the second embodiment of the present invention. FIG. 11 is a flow chart showing a command execution restricting process of a controlling portion of the optical disc drive according to the second embodiment of the present invention. In the second embodiment, it is determined whether or not to execute a first command that causes an optical disc drive 10 to start corresponding to a user's disc close operation for loading a disc to a disc carrier 11 (tray type or drawer type) and a user's acknowledgment operation performed after the optical disc drive 10 is initialized.

As shown in FIG. 8, when the user changes the setting of the optical disc drive 10, before the command generating unit 23 gets started (namely, before the user inputs a command "Reset drv" to a host computer 21 with an inputting unit (for example, a keyboard)), the disc carrier 11 should be opened. To do that, the user presses an ejection button 12 of the optical disc drive 10. Alternatively, the host computer 21 issues an ejection command to the optical disc drive 10.

Next, the user inputs a start command (for example, a command "Reset drv" shown in FIG. 10) that causes the command generating unit 23 to start to the host computer 21 with the inputting unit (for example, the keyboard). The start command that is input by the user is sent to the OS 24. The OS 24 activates the command generating unit corresponding to the start command.

As shown in FIG. 9, when the command generating unit 23 gets started, it sends the first command to the OS 24. (step 90)

The first command is issued just after the command generating unit 23 gets started. For example, the first command causes the optical disc drive 10 to start.

In addition, as shown in FIG. 10, the command generating unit 23 displays for example a message "PLACE ANY DISC ON THE TRAY AND CLOSE THE TRAY" that prompts the user to perform a predetermined operation on an outputting unit (for example, a display). (step 91)

As shown in FIG. 11, the first command that is sent to the OS 24 at step 90 is transferred to a controlling portion 26 through a communication controlling portion 27 of the optical disc drive 10. (step 110)

The controlling portion 26 determines whether or not the transferred command is the valid first command that is issued just after the command generating portion 23 gets started. (step 111)

When the transferred command is not the valid first command, the controlling portion 26 performs a terminating process.

On the other hand, when the transferred command is the first command, the controlling portion 26 determines whether or not the disc carrier 11 is close. (step 112)

When the disc carrier 11 is close, the controlling portion 26 performs a terminating process.

When the disc carrier 11 is open, the controlling portion 26 sets a waiting time period. (step 113)

The waiting time period is the minimum time period for which the controlling portion 26 should wait for executing the first command.

After the waiting time period has elapsed, the controlling portion 26 waits for a signal that represents that the disc carrier 11 is close (hereinafter, this signal is referred to as tray close signal). When the controlling portion 26 receives the tray close signal, the controlling portion 26 starts initializing the optical disc drive 10. (steps 114 to 117)

While the controlling portion 26 is initializing the optical disc drive 10, an LED 13 blinks. After the controlling portion 26 has initialized the optical disc drive 10, the LED 13 puts off. While the controlling portion 26 is initializing the optical disc drive 10, if the controlling portion 26 receives the next command from the OS 24 of the host computer 21, the controlling portion 26 determines that the command has not been issued by the user and performs a terminating process. (step 118)

Figure 16:
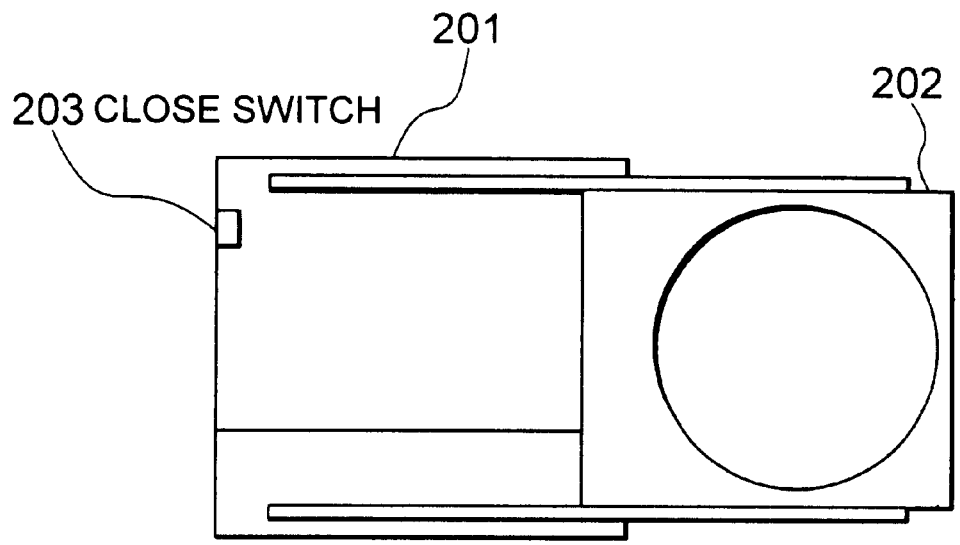
FIG. 16 is a schematic diagram showing the concept of a thin (drawer) type driving unit of an optical disc drive according to an embodiment of the present invention.
Figure 17:
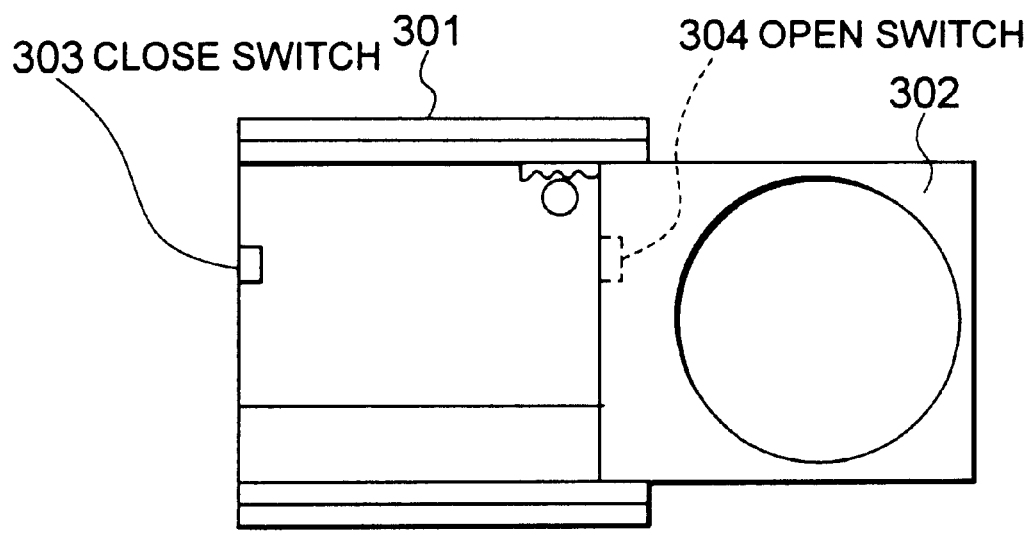
FIG. 17 is a schematic diagram showing the concept of a thick (tray) type driving unit of an optical disc drive according to an embodiment of the present invention.

The tray close signal is detected by the following mechanism. FIGS. 16 and 17 are schematic diagrams showing examples of tray close signal detecting mechanisms. In the example shown in FIG. 16, the tray close detecting mechanism does not have a motor that loads and unload the disc carrier 202. The tray close detecting mechanism has a detecting switch 203 disposed at an inner position of a cabinet 201. The detecting switch 203 is composed of for example a transmission type of an optical sensor. When the disc carrier 202 is loaded to the cabinet 201, light emitted to the optical sensor is blocked by the disc carrier 202. Thus, the level of an output signal of the detecting switch 203 varies. The controlling portion of the optical disc drive recognizes the variation of the level of the output signal of the detecting switch 203 so as to detect the tray close signal.

In the example shown in FIG. 17, the tray close detecting mechanism has a motor that loads and unloads the disc carrier. The tray close detecting mechanism has detecting switches 303 and 304. The detecting switch 303 is disposed at an inner position of the cabinet 301. The detecting switch 304 is disposed at an entrance of the cabinet 301. The detecting switches 303 and 304 are composed of for example a transmission type of optical sensors. When the disc carrier 302 is loaded to and unloaded from the cabinet 301, light emitted to the optical sensors is blocked by the disc carrier 302. Thus, the levels of output signals of the detecting switches 303 and 304 are inverted. When the variations of the levels of the output signals of the detecting switches 303 and 304 satisfy predetermined conditions, the controlling portion of the optical disc drive detects the tray close signal.

After the optical disc drive 10 has been initialized, as shown in FIG. 10, the OS 24 of the host computer 21 displays a message on the screen that prompts the user to press the ENTER key. After the OS 24 has displayed the message, the OS waits for a user's input of the ENTER KEY. (step 92)

After the LED 13 puts off, the user knows that the optical disc drive 10 has been initialized and then presses the ENTER key with the inputting unit 25 (for example, the keyboard). Thus, the command generating unit 23 issues a second command corresponding to the input of the ENTER key to the OS 24 of the host computer 21. (step 93)

The second command is just a command that causes the input of the ENTER key to be transferred to the OS 24 of the host computer 21.

On the other hand, after the optical disc drive 10 has been initialized, the controlling portion 26 of the optical disc drive 10 determines whether or not a disc has been placed on the disc carrier 11. (step 119)

When a disc has not been placed on the disc carrier 11, the controlling portion 26 performs a terminating process. When a disc has been placed on the disc carrier 11, the controlling portion 26 sets a predetermined transfer waiting time period. (step 120)

When the controlling portion 26 receives the next command from the OS 24 of the host computer 21 in the transfer waiting time period, the controlling portion 26 determines whether or not the received command is the second command representing that the user has pressed the ENTER key. (steps 121 to 123)

When the received command is not the second command, the controlling portion 26 cancels the received command as a command that has not been issued by the user and performs a terminating process. When the received command is the second command, the command executing portion 28 executes the first command. (step 124)

In addition, the controlling portion 26 displays a message representing that the optical disc drive 10 has been set. (step 94)

(3) Third Embodiment

Next, with reference to FIGS. 12 to 15, a third embodiment of the present invention will be described.

Figure 12:
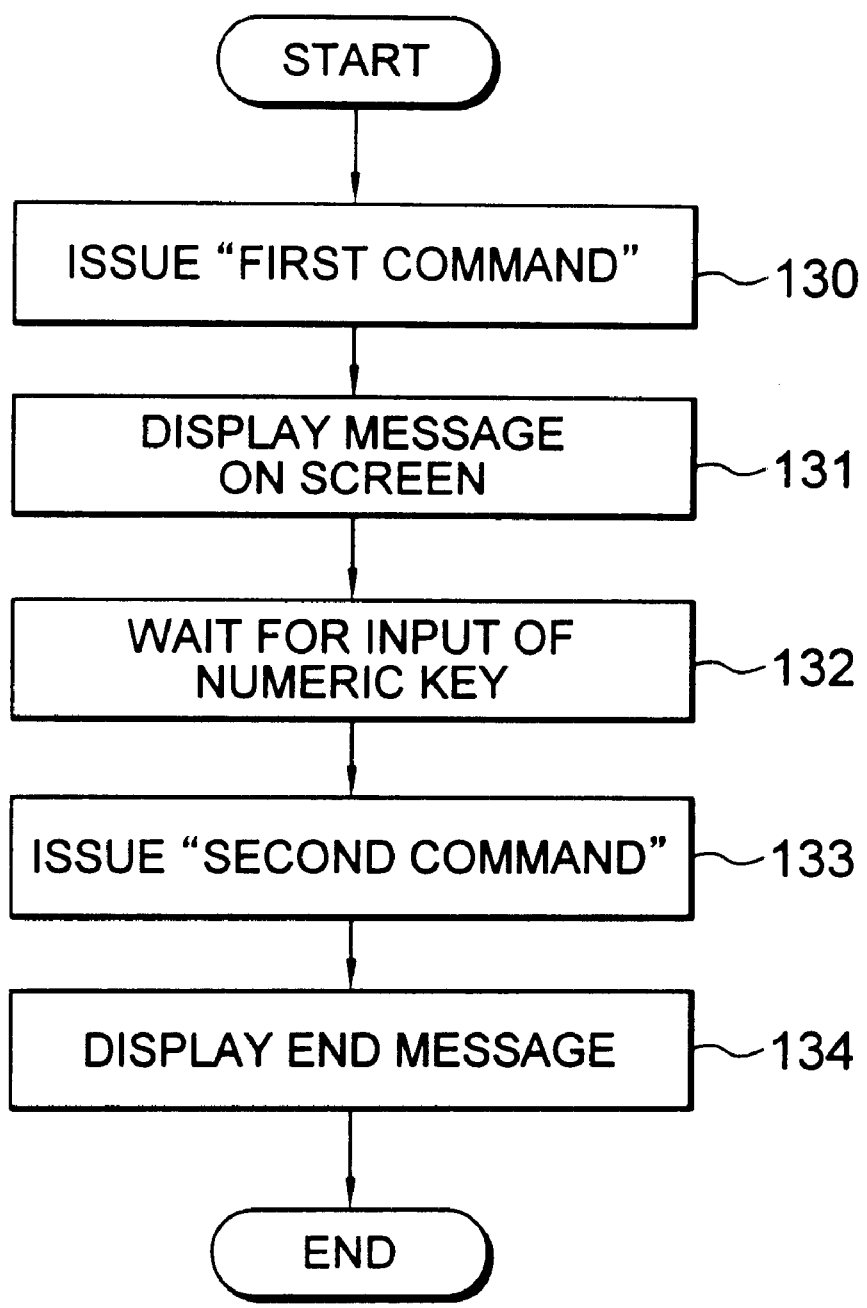
FIG. 12 is a flow chart showing an operation process of a command generating unit of a host computer according to a third embodiment of the present invention.
Figure 14:
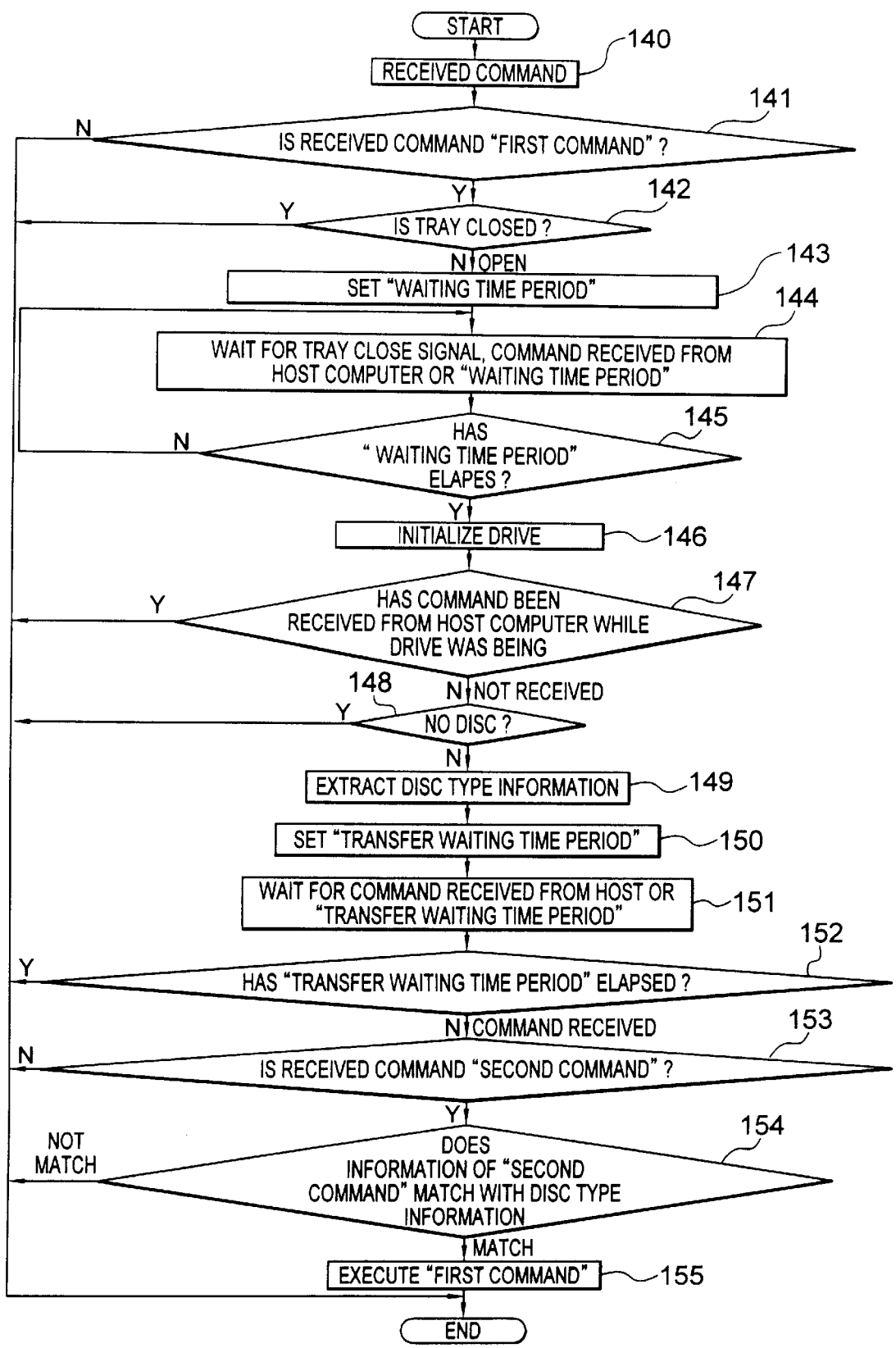
FIG. 14 is a flow chart showing a command execution restricting process of a controlling portion of the optical disc drive according to the third embodiment of the present invention.
Figure 15:
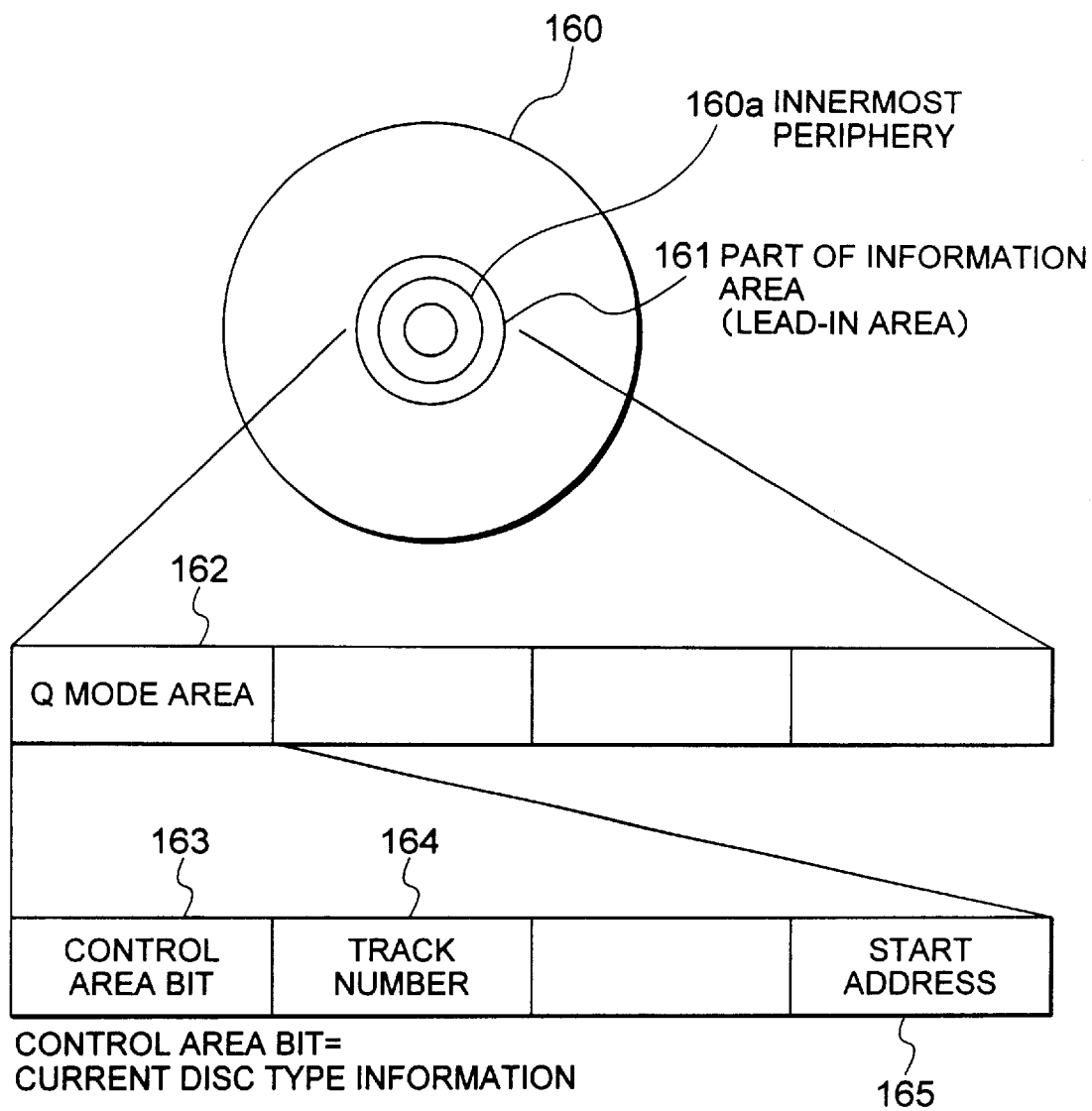
FIG. 15 is a schematic diagram showing an example of disc type information of the optical disc drive according to the third embodiment of the present invention.

FIG. 12 is a flow chart showing an operation process of a command generating unit of a host computer according to a third embodiment of the present invention. FIG. 13 is a schematic diagram showing the content of an output screen according to the third embodiment of the present invention. FIG. 14 is a flow chart showing a command execution restricting process of a controlling portion of the optical disc drive according to the third embodiment of the present invention. FIG. 15 is a schematic diagram showing an example of disc type information of the optical disc drive according to the third embodiment of the present invention.

As shown in FIG. 8, when the user changes the settings of the optical disc drive 10, before the command generating unit 23 gets started (namely, before the user inputs a command "Reset drv" with an inputting unit 25 (for example, a keyboard)), a disc carrier 11 should be opened.

Next, the user inputs a start command (for example, a command "Reset drv" shown in FIG. 10) that causes the command generating unit 23 to start to the host computer 21 with the inputting unit (for example, the keyboard). The start command that is input by the user is sent to the OS 24. The OS 24 activates the command generating unit corresponding to the start command.

As shown in FIG. 12, when the command generating unit 23 gets started, it sends the first command to the OS 24. (step 130)

The first command is issued just after the command generating unit 23 gets started. For example, the first command causes the optical disc drive to start.

In addition, as shown in FIG. 13, the command generating unit 23 displays for example a message "PLACE ANY DISC ON THE TRAY AND CLOSE THE TRAY" that prompts the user to perform a predetermined operation on an outputting unit (for example, a display). (step 131)

As shown in FIG. 14, the first command that is sent to the OS 24 at step 130 is transferred to a controlling portion 26 through a communication controlling portion 27 of the optical disc drive 10. (step 140)

The controlling portion 26 determines whether or not the transferred command is the valid first command that is issued just after the command generating portion 23 gets started. (step 141)

When the transferred command is not the valid first command, the controlling portion 26 performs a terminating process.

On the other hand, when the transferred command is the first command, the controlling portion 26 determines whether or not the disc carrier 11 is close. (step 142)

When the disc carrier 11 is close, the controlling portion 26 performs a terminating process.

When the disc carrier 11 is open, the controlling portion 26 sets a waiting time period. (step 143)

The waiting time period is the minimum time period for which the controlling portion 26 should wait for executing the first command.

After the waiting time period has elapsed, the controlling portion 26 waits for a signal that represents that the disc carrier 11 is close (hereinafter, this signal is referred to as tray close signal). When the controlling portion 26 receives the tray close signal, the controlling portion 26 starts initializing the optical disc drive 10. (steps 144 to 146)

While the controlling portion 26 is initializing the optical disc drive 10, an LED 13 blinks. After the controlling portion 26 has initialized the optical disc drive 10, the LED 13 puts off. While the controlling portion 26 is initializing the optical disc drive 10, if the controlling portion 26 receives the next command from the OS 24 of the host computer 21, the controlling portion 26 determines that the command has not been issued by the user and performs a terminating process.

The tray close signal has the same mechanism that it is described in the second embodiment.

When the controlling portion 26 receives the next command from the OS 24 of the host computer 21 while the controlling portion 26 is initializing the optical disc drive 10, the controlling portion 26 treats the received command as a command that has not been issued by the user and performs a terminating process. After the controlling portion 26 has initialized the optical disc drive 10, the controlling portion 26 determines whether or not a disc has been placed on the disc carrier 11. (step 147 and step 148)

When a disc has not been placed on the disc carrier 11, the controlling portion 26 performs a terminating process. When a disc has been placed on the disc carrier 11, the controlling portion 26 extracts disc type information from the disc. (step 149)

As shown in FIG. 15, a disc 160 has a lead-in area that contains disc management information. The lead-in area 161 is disposed on an innermost periphery 160a of the disc 160. The lead-in area 161 has a Q mode area 162 that contains information of each track of the disc. The Q mode area 162 contains a control area bit portion 163, a track signal 164, a start address 165, and so forth. The disc type information is contained in the control area bit portion 163.

On the other hand, after the optical disc drive 10 has been initialized, as shown in FIG. 13, the user selects a disc type number of the disc placed on the disc carrier 11 from a disc type list displayed on the screen with the inputting unit 25 (for example, the keyboard). After the optical disc drive 10 has been initialized, the command generating unit 23 waits for a user's input of the disc type number. (step 132)

When the controlling portion 26 has received the disc type number, the controlling portion 26 generates a second command corresponding to the input disc type number. The second command is transferred to the optical disc drive 10 through the OS 24. (step 133)

After the controlling portion 26 of the optical disc drive 10 has extracted the disc type information from the disc, the controlling portion 26 sets a predetermined transfer waiting time period. (step 150)

When the controlling portion 26 receives the next command from the OS 24 of the host computer 21 in the transfer waiting time period, the controlling portion 26 determines whether or not the received command is a second command that represents the disc type selected by the user. (steps 151 to 153)

When the received command is not the second command, the controlling portion 26 cancels the received command as a command that has not been issued by the user and performs a terminating process. On the other hand, when the received command is the second command, the command validity determining portion 29 compares the disc type information obtained from the disc with the disc type information represented by the second command. (step 154)

When the disc type information of the disc matches the disc type information of the second command, the command validity determining portion 29 determines that the first command is a valid command. The command executing portion 28 executes the first command. (step 155)

After the command executing portion 28 has executed the first command, the command generating unit 23 displays a message that represents that the optical disc drive has been set on the screen as shown in FIG. 13 and performs a terminating process. (step 134)

As described above, according to the above-described embodiments, since the optical disc drive determines whether or not a command received from the host computer is valid corresponding to information that is generated by the operation of the ejection button, the tray close operation, the operation of the ENTER key of the keyboard, or the disc type selection operation that can be performed by only the true user. Thus, the optical disc drive can be prevented from executing a virus-infected command that has not been issued by the user.

The present invention is not limited to the above-described embodiments. In other words, in the scope and spirit of the present invention, various modifications and changes are available.

In the above-described embodiments, an optical disc drive was explained. However, the function according to the present invention can be applied to an optical disc drive in such a manner that a program stored in a program record medium such as a floppy disk or a CD-ROM is installed to a system.

In addition, a program that accomplishes the function according to the present invention can be downloaded through a communication line.

The function according to the present invention may be supplied to an optical disc drive with a program stored in a semiconductor memory such as a flash ROM or an EEPROM (Electrically Erasable Programmable Read Only Memory).

In the first embodiment, when the count value of which the ejection switch 31 has been successively pressed in the predetermined time period matches the value of the second command transferred from the host computer 21, the first command is executed. Alternatively, a command that represents the end of the operation of the ejection switch 31 may be used as the second command. In this case, after the count value of which the ejection switch has been successively pressed in a predetermined time period is detected until the command is transferred, when the count value matches the predetermined value, the first command is executed.

The waiting time period may be a time period after the ejection switch is pressed until the disc stops and the tray with the disc is fully unloaded.

The waiting time period after the transfer time of the first command until the end of the operation can be freely selected by the user. The waiting time period defines the end time of the entire operation of the optical disc drive. Thus, a computer virus cannot imitate the second command transferred to the optical disc drive. Likewise, the transfer waiting time period can be freely selected by the user. Even if a computer virus performs a particular operation in the waiting time period, it is very difficult to imitate the second command in the transfer waiting time period.

The ejecting operation of the ejection switch used in the command execution restricting method of the disc reproducing apparatus according to the present invention does not relate to the normal ejecting operation of the apparatus.

FIGS. 16 and 17 are conceptual diagrams showing the disc carriers in the case that the ejection switch is pressed.

As shown in FIGS. 16 and 17, the close switches detect whether or not the tray/drawer is closed.

The normal ejecting state means a state that a part or all of a disc or a cassette that surrounds the disc protrudes from the disc reproducing apparatus.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A command executing method for an information reproducing apparatus connected to a host computer, comprising the steps of:
   receiving a command from the host computer;
   prompting a user to directly operate the information reproducing apparatus or an input of the host computer in a specified manner after receipt of the command; and
   executing the command only after determining that the specified direct operation set forth in the prompting step has occurred in the specified manner.

2. The command executing method according to claim 1, wherein the direct operation comprises an operation of an ejection button of the information reproducing apparatus in the specified manner.

3. The command executing method according to claim 1, wherein the direct operation comprises a tray close operation of the information reproducing apparatus in the specified manner.

4. The command executing method according to claim 1, wherein the direct operation comprises operation of a keyboard input of the host computer in the specified manner.

5. The command executing method according to claim 1, wherein the direct operation comprises a type of medium selection operation for the information reproducing apparatus through the host computer input in the specified manner.

6. A disc reproducing apparatus for reproducing information as a digital signal from a disc, the disc reproducing apparatus having an interface for sending and receiving a reproduction signal and a command to or from a host computer, comprising:
   a processor unit for controlling the operation of the disc reproducing apparatus;
   means for receiving a command transferred from the host computer;
   means for prompting a user to operate the information reproducing apparatus or an input of the host computer in a specified manner after receipt of the command;
   means for detecting operation of the disc reproducing apparatus or an input to the host computer in response to the prompting by the means for prompting and providing a validation indication; and
   means for executing the command after the validation indication is provided by the means for detecting.

7. The disc reproducing apparatus according to claim 6, wherein the operation prompted by the means for prompting comprises an operation of an ejection button of the disc reproducing apparatus in the specified manner.

8. The disc reproducing apparatus according to claim 6, wherein the operation prompted by the means for prompting comprises a tray close operation for the disc reproducing apparatus in the specified manner.

9. The disc reproducing apparatus according to claim 6, wherein the operation prompted by the means for prompting comprises an operation of a keyboard input of the host computer in the specified manner.

10. The disc reproducing apparatus according to claim 6, wherein the operation prompted by the means for prompting comprises a type of disc selection operation for the disc reproducing apparatus to be performed through the input of the host computer in the specified manner.

11. A command executing method of an information reproducing apparatus connected to a host computer having means for providing commands and means for indicating messages, comprising the steps of:
   receiving a command from said means for providing commands;
   indicating a prompting message via the means for indicating messages, said prompting message prompting a user to operate the information reproducing apparatus or an input means of the host computer in a specified manner after the receiving step;
   determining whether the operation prompted by the prompting step has been performed or not; and
   executing the command only after the determining step determines that the operation prompted by the prompting step has been performed.

12. The command executing method according to claim 11, wherein the operation prompted by the prompting step comprises operation of an ejection button of the information reproducing apparatus in the specified manner.

13. The command executing method according to claim 11, wherein the operation prompted by the prompting step comprises a tray close operation for the information reproducing apparatus in the specified manner.

14. The command executing method according to claim 11, wherein the operation prompted by the prompting step comprises an operation of a keyboard input portion of the input means of the host computer in the specified manner.

15. The command executing method according to claim 11, wherein the operation prompted by the prompting step comprises a type of disc selection operation for the disc reproducing apparatus to be performed through the input means of the host computer in the specified manner.

16. A system having a host computer and an information reproducing apparatus, comprising:

an inputting unit configured to input a predetermined command;

a generating unit contained in a host computer and configured to generate a first command in response to input of the predetermined command through the inputting unit;

a display configured to display a prompting message for prompting a user to operate the information reproducing apparatus or the inputting unit in a specified manner in response to the first command generated by the generating unit;

a determining portion configured to determine whether the operation prompted by the prompting message displayed by the display has been performed; and an executing portion contained in the information reproducing apparatus and configured to execute the first command only after the determining portion determines the operation prompted by the prompting message displayed by the display has been performed.

* * * * *